United States Patent
Santosuosso (10) Patent No.: US 8,239,383 B2
(45) Date of Patent: Aug. 7, 2012

(54) SYSTEM AND METHOD FOR MANAGING EXECUTION OF QUERIES AGAINST DATABASE SAMPLES

(75) Inventor: John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1372 days.

(21) Appl. No.: 11/424,268

(22) Filed: Jun. 15, 2006

(65) Prior Publication Data

US 2007/0294214 A1  Dec. 20, 2007

(51) Int. Cl.
G06F 7/00 (2006.01)

(52) U.S. Cl. ........ 707/731; 707/705; 707/710; 707/749; 709/200

(58) Field of Classification Search .................. 707/705, 707/710, 731, 749; 709/200
See application file for complete search history.

(56) References Cited

U.S. PATENT DOCUMENTS

| | | | |
|---|---|---|---|
| 6,026,391 A | 2/2000 | Osborn et al. | |
| 6,240,409 B1 | 5/2001 | Aiken | |
| 6,256,639 B1 | 7/2001 | Himmel et al. | |
| 6,347,314 B1 | 2/2002 | Chidlovskii | |
| 6,466,931 B1 | 10/2002 | Attaluri et al. | |
| 6,728,720 B1 | 4/2004 | Lenzie | |
| 6,775,664 B2 | 8/2004 | Lang et al. | |
| 2003/0028512 A1 | 2/2003 | Stensmo | |
| 2004/0054666 A1 | 3/2004 | Lapir et al. | |
| 2004/0193586 A1 | 9/2004 | Sashida et al. | |
| 2004/0236726 A1 | 11/2004 | Ewing et al. | |
| 2004/0260681 A1 | 12/2004 | Dvorak | |
| 2007/0168315 A1* | 7/2007 | Covannon et al. | 707/1 |

* cited by examiner

Primary Examiner — Don Wong
Assistant Examiner — Tuan-Khanh Phan
(74) Attorney, Agent, or Firm — Patterson & Sheridan, LLP (57) ABSTRACT

A method, system and article of manufacture for query execution management and, more particularly, for managing execution of queries against database samples. One embodiment provides a computer-implemented method for managing execution of a query against a database having a multiplicity of data records. The method comprises receiving, from a requesting entity, a query against the database, and performing an automated execution process, comprising: (i) iteratively executing the query against samples of the database, each sample including a subset of the multiplicity of data records, (ii) after each iterative execution of the query, determining whether a query result obtained for the iterative execution satisfies a predefined condition, and (iii) if the predefined condition is not satisfied, performing a predefined action.

24 Claims, 4 Drawing Sheets

SYSTEM AND METHOD FOR MANAGING EXECUTION OF QUERIES AGAINST DATABASE SAMPLES

BACKGROUND OF THE INVENTION

1. Field of the Invention

The present invention generally relates to query execution management and, more particularly, to managing execution of queries against database samples.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

A DBMS is structured to accept commands to store, retrieve and delete data using, for example, high-level query languages such as the Structured Query Language (SQL). The term "query" denominates a set of commands for retrieving data from a stored database. These queries may come from users, application programs, or remote systems (clients or peers). The query language requires the return of a particular data set in response to a particular query but the method of query execution ("Query Execution Plan") employed by the DBMS is not specified by the query. The method of query execution is typically called an execution plan, an access plan, or just "plan". There are typically many different useful execution plans for any particular query, each of which returns the required data set. Selecting a particular plan from the plurality of possible plans is the job of an "optimizer". For large databases, the execution plan selected by the optimizer to execute a query must provide the required data at a reasonable cost in time and hardware resources.

Optimization, and execution generally, can be a resource intensive and time-consuming process. Further, the larger the database, the longer the time needed to execute the query. From the end user's standpoint, the undesirable impact of query execution overhead is increased when a plurality of queries is executed. In many data mining and data query scenarios, it is often the case that the end user does not know, at the outset, the precise data they are after. Nor does the user appreciate the performance implications of running a particular query. In this scenario, the user typically issues a query, examines the results, modifies the query based on analysis of the results and then runs the modified query. In cases where the data being queried is very extensive and complex, this can be a very time and resource intensive process, given the duplicative processing that takes place each time the user submits a new query.

Given the increasing demands by users for faster execution, various efforts are being directed to returning results to users more quickly. One known approach is to utilize sampling. In general, sampling refers to the execution of queries against a subset of the entire database. In this way, query results can be identified and returned more quickly, since the queries are only being executed against a portion of all available data. One of the disadvantages of sampling is that the result often reflects an approximation rather than an exact answer. However, in many situations, the approximations are adequate for practical purposes. Thus, sampling techniques may provide users an adequate approximate response in a fraction of the time needed to get the exact answer.

Despite the utility of known sampling techniques, these techniques do not provide sufficient flexibility to accommodate certain situations. For example, query execution against a sample of a database is typically performed in single iterations. In other words, when a user submits a query for execution, the RDBMS will select a sample of the database, execute the query and then return the results to the user. The user then inspects the results and may determine to execute the query against a different sample of the database. This manual process may go on over multiple iterations until the user is satisfied with the result. However, this is a time-consuming, manual process.

Therefore, there is a need for query execution sampling techniques providing additional functionality and flexibility.

SUMMARY OF THE INVENTION

The present invention is generally directed to a method, system and article of manufacture for query execution management and, more particularly, for managing execution of queries against database samples.

One embodiment provides a computer-implemented method for managing execution of a query against a database having a multiplicity of data records. The method comprises receiving, from a requesting entity, a query against the database, and performing an automated execution process, comprising: (i) iteratively executing the query against samples of the database, each sample including a subset of the multiplicity of data records, (ii) after each iterative execution of the query, determining whether a query result obtained for the iterative execution satisfies a predefined condition, and (iii) if the predefined condition is not satisfied, performing a predefined action.

Another embodiment provides a computer readable medium containing a program which, when executed, performs operations for managing execution of a query against a database having a multiplicity of data records. The operations comprise receiving, from a requesting entity, a query against the database, and performing an automated execution process, comprising: (i) iteratively executing the query against samples of the database, each sample including a subset of the multiplicity of data records, (ii) after each iterative execution of the query, determining whether a query result obtained for the iterative execution satisfies a predefined condition, and (iii) if the predefined condition is not satisfied, performing a predefined action.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

The present invention is generally directed to a method, system and article of manufacture for query processing and, more particularly, for managing execution of a query against data in a database. In general, queries are executed against one or more underlying databases, each having a multiplicity of data records. Each query includes at least one result field for which data from the underlying database(s) is to be returned in a corresponding result set. A query may further include one or more query conditions for filtering which of the data records contained in the underlying database(s) are returned for each result field.

In one embodiment, a query against a database having a multiplicity of data records is received from a requesting entity. The received query is processed by an automated execution process which iteratively executes the query against samples of the database. Each sample includes a subset of the multiplicity of data records included with the database.

After each iterative execution of the query, it is determined whether a query result obtained for the iterative execution satisfies a predefined condition. For instance, the predefined condition may define an allowable range of values for values included with the query result. Accordingly, the predefined condition can only be satisfied if the values of the obtained query result are included with the allowable range.

In one embodiment, if the predefined condition is not satisfied, a predefined action is performed. For instance, the iterative execution of the query against the samples of the database is interrupted and the requesting entity is notified that the values of the query result are not included with the allowable range of values. Thus, the requesting entity can decide whether query processing should be terminated. If query processing should not be terminated, the iterative execution can be re-started or resumed in one embodiment using a modified query or a modified predefined condition.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, computer system 110 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Computing Environment

Figure 1:
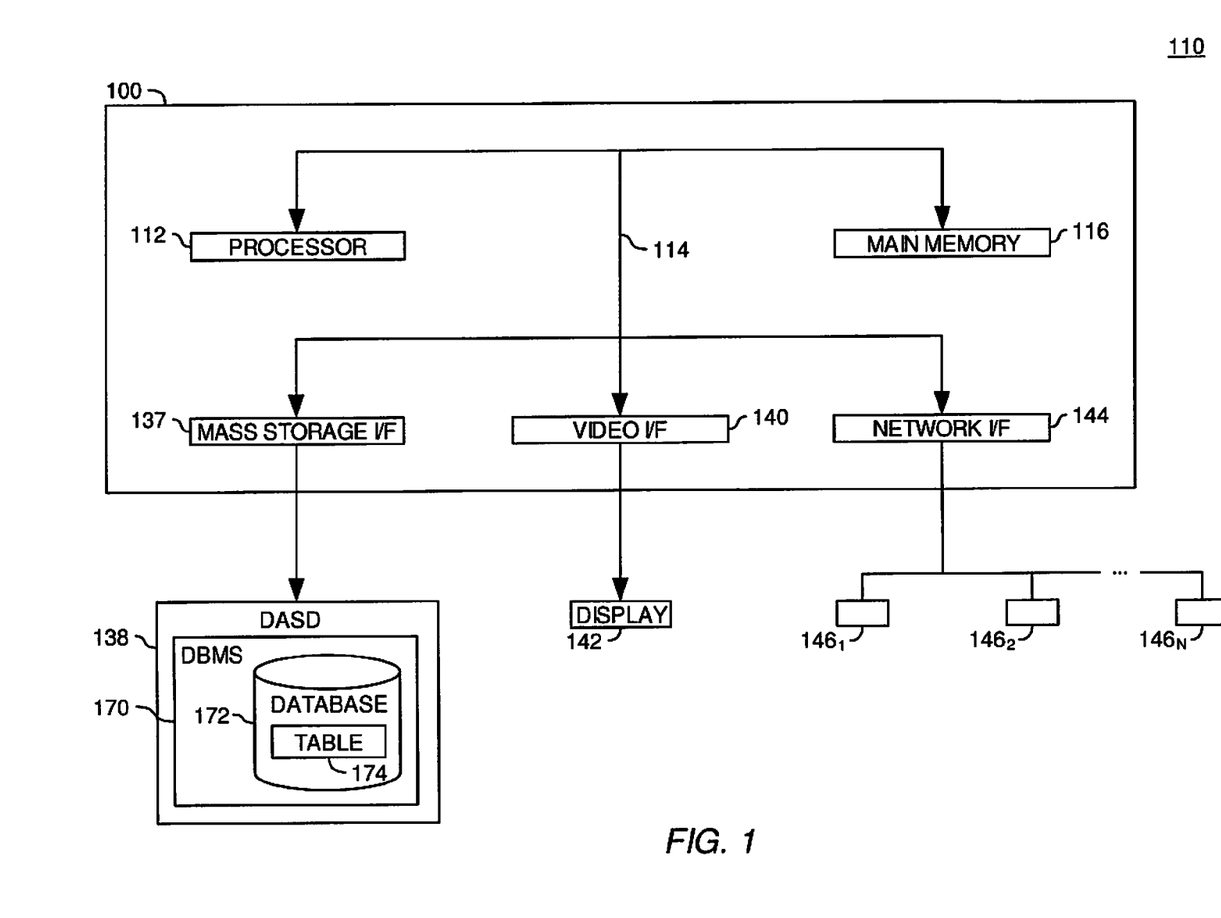
FIG. 1 illustrates a computer system that may be used in accordance with the invention.

FIG. 1 shows a computer 100 (which is part of a computer system 110) that becomes a special-purpose computer according to an embodiment of the invention when configured with the features and functionality described herein. The computer 100 may represent any type of computer, computer system or other programmable electronic device, including a client computer, a server computer, a portable computer, a personal digital assistant (PDA), an embedded controller, a PC-based server, a minicomputer, a midrange computer, a mainframe computer, and other computers adapted to support the methods, apparatus, and article of manufacture of the invention. Illustratively, the computer 100 is part of a networked system 110. In this regard, the invention may be practiced in a distributed computing environment in which tasks are performed by remote processing devices that are linked through a communications network. In a distributed computing environment, program modules may be located in both local and remote memory storage devices. In another embodiment, the computer 100 is a standalone device. For purposes of construing the claims, the term "computer" shall mean any computerized device having at least one processor. The computer may be a standalone device or part of a network in which case the computer may be coupled by communication means (e.g., a local area network or a wide area network) to another device (i.e., another computer).

In any case, it is understood that FIG. 1 is merely one configuration for a computer system. Embodiments of the invention can apply to any comparable configuration, regardless of whether the computer 100 is a complicated multi-user apparatus, a single-user workstation, or a network appliance that does not have non-volatile storage of its own.

The computer 100 could include a number of operators and peripheral systems as shown, for example, by a mass storage interface 137 operably connected to a storage device 138, by a video interface 140 operably connected to a display 142, and by a network interface 144 operably connected to the plurality of networked devices 146 (which may be representative of the Internet) via a suitable network. The display 142 may be any video output device for outputting viewable information.

Although storage 138 is shown as a single unit, it could be any combination of fixed and/or removable storage devices, such as fixed disc drives, floppy disc drives, tape drives, removable memory cards, or optical storage. Illustratively, storage 138 includes a DBMS 170 having a database 172 that includes one or more tables 174. Each of the tables 174 includes one or more data records. As used herein, the term "database" refers to any collection of data regardless of the particular physical representation. By way of illustration, the database 172 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

Computer 100 is shown comprising at least one processor 112, which obtains instructions and data via a bus 114 from a main memory 116. The processor 112 could be any processor adapted to support the methods of the invention. In particular, the computer processor 112 is selected to support the features of the present invention. Illustratively, the processor is a PowerPC® processor available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer 100 via bus 114. Thus, main memory 116 and storage device 138 could be part of one virtual address space spanning multiple primary and secondary storage devices.

An Exemplary Query Execution Environment

Figure 2:
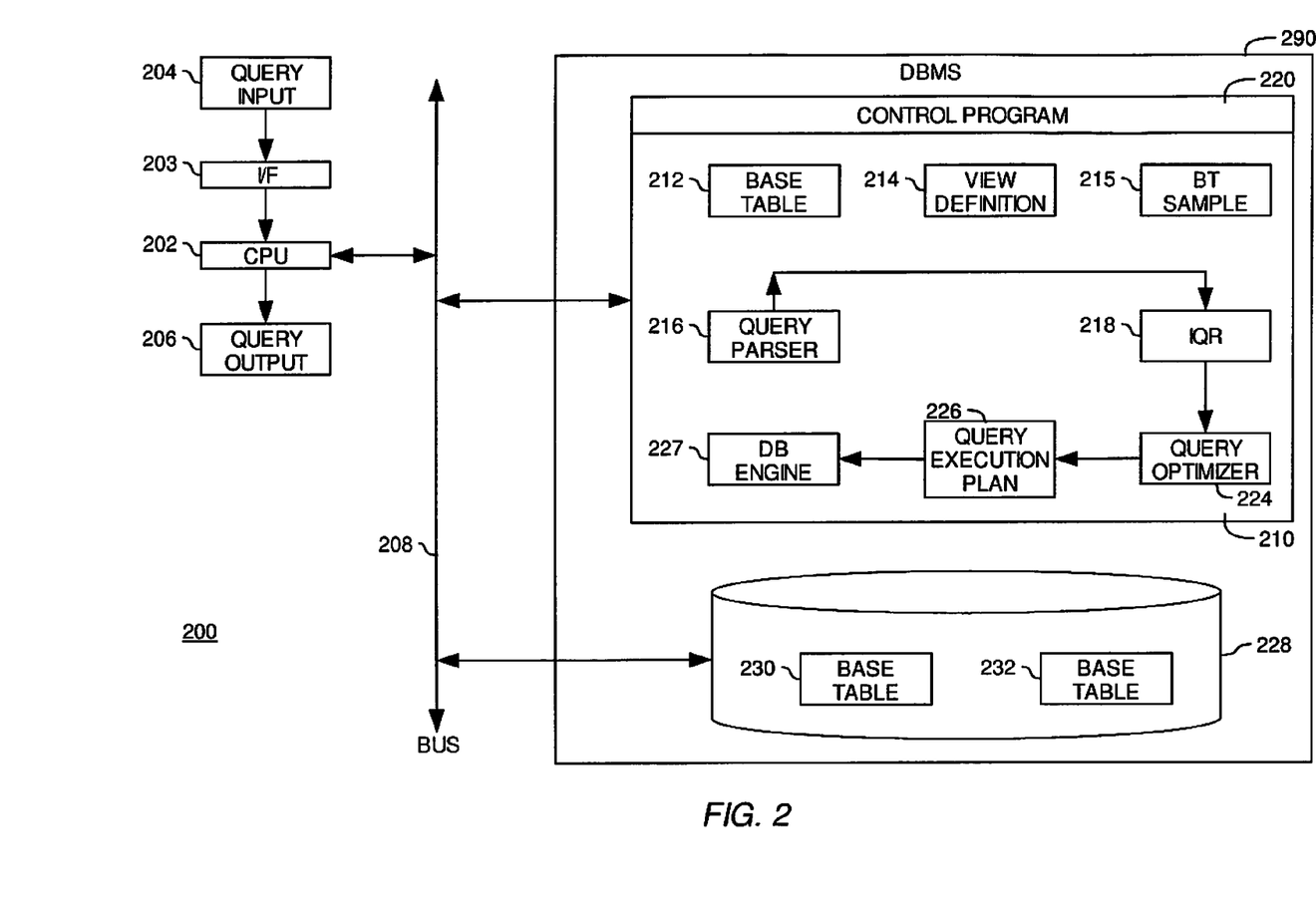
FIG. 2 is a relational view of components implementing the invention.

FIG. 2 illustrates one embodiment of a query processing system 200. In the query processing system 200 query input 204 is received by a central processing unit (CPU) 202, such as the processor 112 in FIG. 1, via a suitable user interface 203 to produce corresponding output data 206. More generally, queries are input by a user or selected from stored queries and processed by the system 200 to produce a result set. In one embodiment, the input queries conform to the SQL standard interface, and invoke functions performed by RDBMS software. Illustratively, the RDBMS software may comprise the "DB2" product offered by the IBM Corporation. Those skilled in the art will recognize that the present invention has application to any RDBMS software that uses SQL, and may similarly be applied to non-SQL queries.

As used herein, a "query" includes a combination of SQL commands intended to produce one or more output data tables (query results) according to specification included in the query. The query results may be displayed to the user via an output device, such as the display 142 of FIG. 1.

System 200 illustratively includes a DBMS 290, such as the DBMS 170 of FIG. 1, having an address space 210, a control program object 220 and a database 228, such as the database 170 of FIG. 1. The database 228 includes a generally large plurality of base tables, such as table(s) 174 of FIG. 1, which are illustratively exemplified by base tables 230 and 232. These base tables are moved partially or entirely between address space 210 and database 228 in a manner well-known in the art for database management systems. The address space 210 is shown schematically as containing program objects and data objects. A base table 212 having a multiplicity of data records is an example of a data object pulled into address space 210 from the database 228 by way of bus 208. A view definition 214 is another data object representing a "virtual table" made up of elements from one or more base tables in accordance with a VIEW definition statement. A base table sample 215 is another data object that is created by selecting a subset of data records from the multiplicity of data records of the base table 212.

Address space 210 also includes the control program object 220, which manages other components of system 200. These components include a query parser 216 for accepting an input query and forwarding it to an Internal Query Representation (IQR) optimizer 218. IQR optimizer 218 rewrites the parsed IQR representation of the user query to provide a "canonical form" of the IQR representation for output to the query optimizer 224. For instance, a IQR canonical form may include a large cyclical join graph having data-flow arcs from many base tables.

After query optimizer 224 receives the canonical "database-integral" (DI) IQR from IQR optimizer 218, a generally large number of useful plans for executing the DI-IQR are generated and tested for "cost" in accordance with a predetermined cost formula. After identifying an "optimal" query execution plan, optimizer 224 produces this plan as a program object, depicted as query execution plan 226 in address space 210. Plan 226 is finally executed with the database engine 227 and the resulting table returned for display to the user.

As noted above, the query processor component (the parser 216 and the IQR 218) of the RDBMS will respond to submission of a user query by providing the optimizer 224 with rewritten code that permits selecting from multiple execution plans. After the optimizer 224 receives the rewritten code, optimizer selection techniques can be applied to select the most efficient plan. That is, the optimizer 224 is provided with system information such as the location of tables and parts of tables, the size of such tables, network node locations, system operating characteristics and statistics, and the like.

Generally, the SQL statements received as input from the user specify the data the user wants, in the form of a query, but do not specify how to get it. The access plan represents the computer-generated sequence of operations to obtain the data specified by the user query. Generation of the access plan involves consideration of both the available access paths (indexes, sequential reads, etc.) and system held statistics on the data to be accessed (the size of the table, the number of distinct values in a particular column, etc.), to choose what the RDBMS processor considers to be the most efficient access plan for the query. The selection of the most efficient access plan utilizes query, database, and system information that is available to the optimizer 224.

In one embodiment, the query is executed against database samples. For instance, the database engine 227 may generate one or more base table samples, such as the sample 215, against which the received user query is executed. It should be noted that database sampling techniques are well-known in the art and are, therefore, not described in more detail. In this case, the access plan represents the computer-generated sequence of operations for execution of the query against the database samples. Accordingly, plan selection may include processing needed to implement the sampling and execution described below.

Query Execution Management

Figure 3:
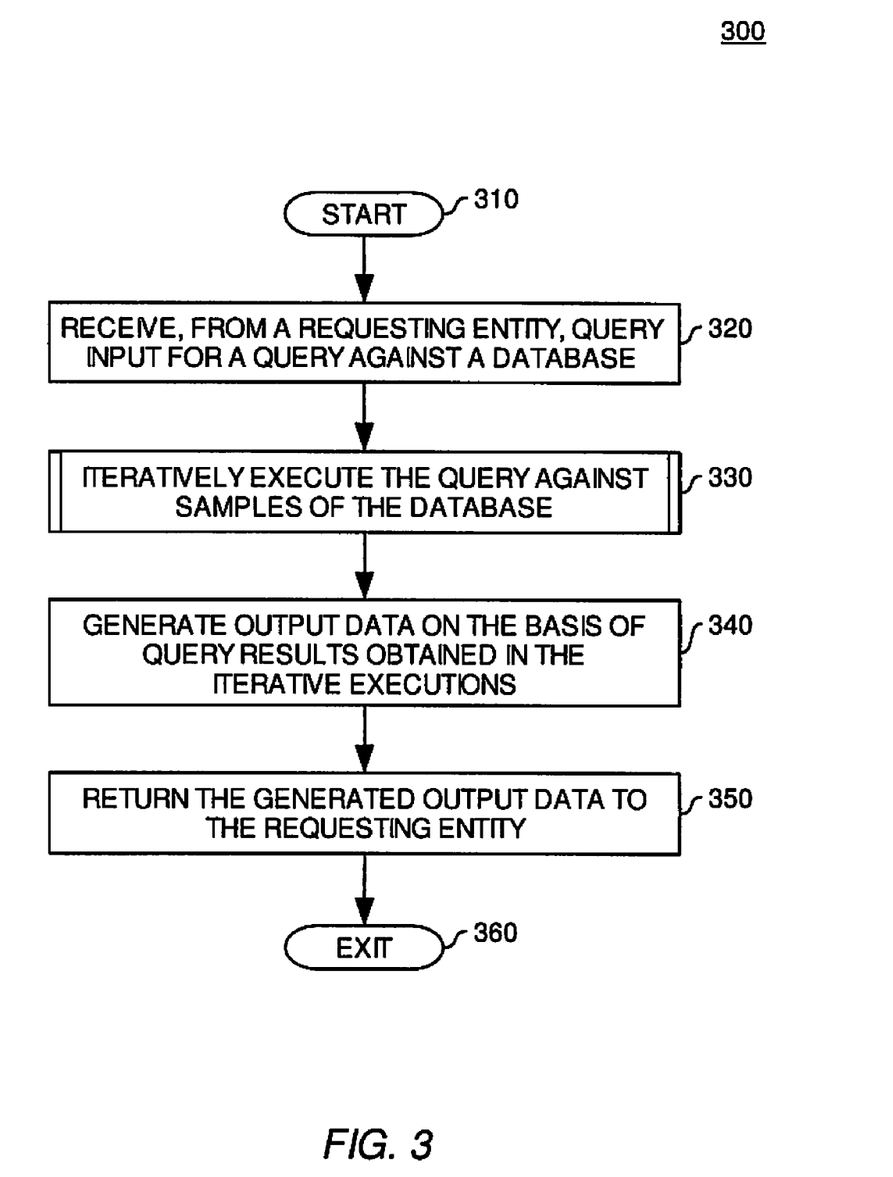
FIG. 3 is a flow chart illustrating query execution management in one embodiment.

Referring now to FIG. 3, one embodiment of a method 300 for query execution management is illustrated. According to one aspect, the method 300 is performed by the DBMS 290 of FIG. 2. In particular, at least part of the steps of method 300 is performed by the database engine 227 of FIG. 2. The method 300 starts at step 310.

At step 320, a query (e.g., query input 204 of FIG. 2) against one or more databases (e.g., database(s) 228 of FIG. 2) is received from a requesting entity. It should be noted that any suitable requesting entity including suitable applications, an operating system and, at the highest level, users may issue queries against the database(s). Accordingly, all such different implementations are broadly contemplated.

In one embodiment, the received query is an SQL query. One of the most common executed SQL queries is the SELECT statement. The SELECT statement generally has the format: "SELECT<clause> FROM<clause> WHERE<clause> GROUP BY<clause> HAVING<clause> ORDER BY<clause>". The clauses must generally follow this sequence. Only the SELECT and FROM clauses are required and all other clauses are optional. The result of a SELECT statement is, in general, a subset of data retrieved from one or more existing tables stored in a relational database, wherein the FROM clause identifies the name of the table or tables from which the data is being selected. The subset of data is treated as a new table, termed the result table. The WHERE clause determines which rows should be returned in the result table. Generally, the WHERE clause contains one or more query conditions that must be satisfied by each row returned in the result table. The rows that meet the query condition(s) form an intermediate set, which is then processed further according to specifications in the SELECT clause. The query condition(s) are typically one or more predicates, each of which specifies a comparison between two values from certain columns, constants, correlated values or user-defined functions. Multiple predicates in the WHERE clause are typically connected by Boolean operators, such as Boolean AND and/or OR operators. An exemplary SQL query that illustrates the query input 204 of FIG. 2 is shown in Table I below.

TABLE I

EXEMPLARY SQL QUERY

001: SELECT machine_type, training_duration, training_level,
002:     avg(optimal_heart_rate/current_heart_rate)
003: FROM master table
004: WHERE gender = 'M' AND age = 25

The exemplary SQL query of Table I is executed on a table "master table" (line 003) and requests information for a plurality of result fields including a "machine_type", "training_duration", "training_level", and "avg(optimal_heart_rate/current_heart_rate)" result field. Each result field corresponds to a column in the underlying "master table" except the "avg(optimal_heart_rate/current_heart_rate)" result field. This derived field is defined as an average value of values where the columns optimal hr is divided by the cols current heart rate. An exemplary "master table" is shown in Table II below.

Using the exemplary SQL query of Table I, a user may try to retrieve all data records (lines 001-002) from the "master table" (line 003) that satisfy the query condition defined by a WHERE clause in line 004. More specifically, the WHERE clause in line 004 defines that information relating to individuals of the gender male ("gender='M'") who are 25 years old ("age=25") should be retrieved from the "master table". An exemplary "master table" that illustrates the base table 212 of FIG. 2 is shown in Table II below.

TABLE II

EXEMPLARY MASTER TABLE

001: member_name age gender weight exercise_date machine_type
002: training_level training_duration current_heart_rate optimal_heart_rate For simplicity, only column headers of the master table are illustrated in the exemplary table of FIG. 2. In other words, assume that the exemplary master table of Table II includes a multiplicity of data records having data that is arranged in a plurality of different columns. These columns illustratively include "member_name", "age", "gender", "weight", "exercise_date", "machine_type", "training_level", "training_duration", "current_heart_rate", and "optimal_heart_rate" columns (lines 001-002). By way of example, assume that the master table relates to clients of a health club and includes training-related information for each client who is identified in the master table by his "member name" (line 001).

For purposes of illustration, the continuation of the description of FIG. 3 is explained with reference to the exemplary SQL query shown in Table I above that is executed against the exemplary master table of Table II. In other words, for the following explanations it is assumed that the exemplary SQL query of Table I was received at step 320. Assume further that the exemplary SQL query of Table I was received from a user using the user interface 203 of FIG. 2 who represents the requesting entity.

At step 330, an automated execution process for execution of the SQL query of Table I against the master table of Table II is performed. In one embodiment, the automated execution process includes iteratively executing the SQL query of Table I against samples of the master table of Table II. An exemplary automated execution process is described in the following with respect to FIG. 4.

Figure 4:
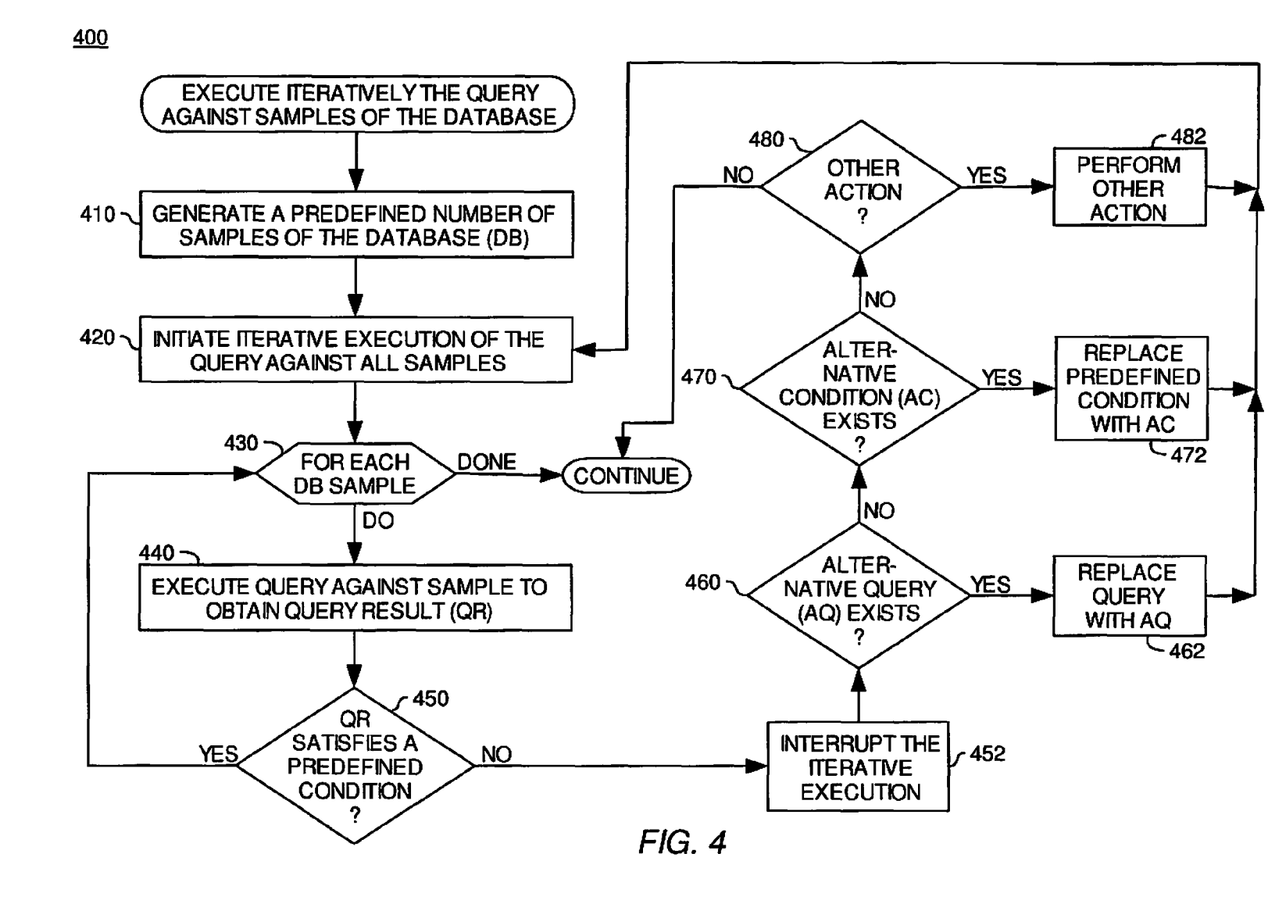
FIG. 4 is a flow chart illustrating iterative query execution against samples of a database in one embodiment.

Referring now to FIG. 4, one embodiment of a method 400 for iteratively executing the SQL query of Table I against samples of the master table of Table II according to step 320 of FIG. 3 is described. According to one aspect, the method 400 is performed by the database engine 227 of FIG. 2.

The method 400 starts at step 410, where a predefined number of samples of the database is generated. More specifically, in the given example a predefined number of samples of the master table of Table II is generated for iterative execution of the SQL query of Table I thereon. By way of example, assume that the master table of Table II includes 100,000 data records and that the predefined number of samples is 100, i.e., that 100 different samples should be created from the master table. Furthermore, in one embodiment only non-overlapping samples are generated such that each data record of the master table of Table II occurs only in a single sample. Thus, repetitive query executions against particular data records can be avoided. Accordingly, by simply dividing the 100,000 data records into 100 groups of data records, 100 different samples each including 1,000 data records can be formed. However, as was noted above, database sampling techniques are well-known in the art and, therefore, not described in detail.

At step 420, the iterative execution of the SQL query of Table I against the generated samples is initiated and a loop consisting of steps 430 to 482 is performed for at least a portion of the generated samples. The loop consisting of steps 430 to 482 is initially entered at step 430 for a first generated sample (e.g., base table sample 215 of FIG. 2).

It should be noted that the first sample can be retrieved from the samples which were created at step 410. However, it should be noted that step 410 is merely optional and that in one embodiment a given sample for a given iterative execution is generated immediately prior to entering the loop consisting of steps 430 to 482. For instance, assume that the first sample is generated when the loop is initially entered at step 430 by selecting a first plurality of data records from the multiplicity of data records of the master table of Table II. Then, when the loop is completed for the first sample, a next sample is generated by selecting another plurality of data records from the master table of Table II. Thereby, for the next sample only data records from the master table of Table II are selected which are not included with the first sample, whereby a non-overlapping next sample is created. The loop consisting of steps 430 to 482 is then performed for the next sample. Thus, only non-overlapping samples that are required for an iterative query execution are generated. All such implementations are broadly contemplated.

In the given example, the SQL query of Table I is initially executed against the first sample at step 440 to obtain a first query result. At step 450, it is determined whether the obtained first query result satisfies a predefined condition. In one embodiment, the predefined condition defines an allowable range of values for values included with the first query result. More generally, the predefined condition defines an allowable range of values for values obtained as query result for each iterative execution of the SQL query of Table I. The predefined condition is only satisfied if the obtained values are within the allowable range.

In one embodiment, the predefined condition is defined by a range table provided by the user. The range table is associated with a particular result field of an underlying query, such as the SQL query of Table I. In one embodiment, the range table is created by the user prior to iterative query execution.

For instance, assume that in the given example the user selects iterative execution of the SQL query of Table I against samples of the master table of Table II when issuing the query (e.g., using the user interface 203 of FIG. 2). Alternatively, the iterative execution can be requested by predetermined user settings or configuration parameters of an underlying DBMS (e.g., DBMS 290 of FIG. 2). The user is then prompted to define the range table for the iterative execution of the query using the user interface. However, in one embodiment the user may select iterative execution prior to query creation and then issue the SQL query of Table I together with the range table. The user may also issue the SQL query of Table I together with the range table if the iterative execution is requested by predetermined user settings or configuration parameters of the underlying DBMS. In one embodiment, the iterative execution can be requested implicitly by including a suitable statement within the underlying query. For instance, the SQL query of Table I may include a statement such as "avg(optimal_heart_rate/current_heart_rate) (WITHIN RANGE) heart rate" included with the WHERE clause in line 004 of Table I. This statement indicates by way of example that the avg(optimal_heart_rate/current_heart_rate) value needs to be within a range ("WITHIN RANGE") defined by a data structure "heart rate". Assume now that "heart rate" refers to an underlying range table such as the exemplary range table of Table III below, e.g., that "heart rate" is the name of the exemplary range table. All such implementations are broadly contemplated.

By way of example, assume that the user creates the exemplary range table of Table III shown below. Assume further that the exemplary range table of Table III is associated with the avg(optimal_heart_rate/current_heart_rate) result field of the SQL query of Table I (line 002 of Table I) above.

TABLE III

EXEMPLARY RANGE TABLE "HEART RATE"

| 001: | sample start | sample end | low value | high value |
|---|---|---|---|---|
| 002: | 1 | 10 | .90 | 1.10 |
| 003: | 11 | 50 | .95 | 1.05 |
| 004: | 51 | 75 | .97 | 1.03 |
| 005: | 76 | 90 | .98 | 1.02 |
| 006: | 91 | 100 | .99 | 1.01 |

In the given example, the exemplary range table of Table III defines allowable value ranges for values of the avg(optimal_heart_rate/current_heart_rate) result field of the SQL query of Table I (lines 002-006). More specifically, in the exemplary range table of Table III, the 100 generated samples of the master table of Table II were illustratively divided into 5 different sampling intervals selected by the user. For instance, a first sampling interval starts with a first sample (sample start "1" in line 002) and ends with the 10$^{th}$ (sample end "10" in line 002). Which of the 100 generated samples is the first, second, third sample etc. depends of the order of execution which is arbitrarily determined by the database engine 227. Furthermore, for each sampling interval an allowable range of values is defined. For instance, line 003 defines an allowable range of values for the second sampling interval which is defined by the eleventh through fiftieth iterative executions, i.e., execution of the SQL query of Table I against the eleventh sample (sample start "11" in line 003) through the fiftieth sample (sample end "50" in line 003). For each one of these samples, the determined value of the avg(optimal_heart_rate/current_heart_rate) result field must be within the range [0.95; 1.05] (low value "0.95" and high value "1.05" in line 003).

Accordingly, in the given example it is determined at step 450 after execution of the SQL query of Table I against the first sample (i.e., sample start "1" in line 002 of Table II) whether the obtained value of the avg(optimal_heart_rate/current_heart_rate) result field is within the allowable range [0.90; 1.10] (low value "0.90" and high value "1.10" in line 002 of Table III). If the obtained value is included with the allowable range, processing returns to step 430, where the loop consisting of steps 430 to 482 is entered for a next sample. Otherwise, processing proceeds with step 452.

For instance, assume that in the given example the obtained value of the avg(optimal_heart_rate/current_heart_rate) result field is 1.15 for the first sample. Accordingly, it is determined at step 452 that the obtained value is not within the allowable range defined in line 002 of Table III. Thus, processing proceeds with step 452.

At step 452, execution of the automated execution process is interrupted. In one embodiment, interrupting the process includes notifying the requesting entity that execution is interrupted.

At step 460, it is determined whether at least one alternative query or a definition of authorized modifications to the SQL query of Table I exists. In one embodiment, an alternative or modified query can be created by the user upon creation of the SQL query of Table I. For instance, assume that an alternative query is available that only differs from the SQL query of Table I in that information with respect to 26 year old individuals ("age=26") instead of 25 year old individuals ("age=25" in line 004 of Table I) is requested. Assume further that three additional queries requesting information for 27, 28 and 29 year old individuals are available. However, it should be noted that the alternative query can also be a completely different query that is not similar to the SQL query of Table I, but that should also be executed against samples of the master table of Table II. Thus, the user can create a plurality of queries that are all automatically executed without further user intervention.

As was noted above, instead of an alternative query a suitable definition of authorized modifications to an existing query may be available. In one embodiment, the suitable definition is included with the underlying query. For instance, in the given example instead of the "age=25" statement a statement indicating a list of possible alternatives can be included with the SQL query of Table I (line 004 of Table I). An illustrative query that exemplifies such a statement is shown in Table IV below.

TABLE IV

EXEMPLARY SQL QUERY

| | |
|---|---|
| 001: | SELECT machine_type, training_duration, training_level, |
| 002: | avg(optimal_heart_rate/current_heart_rate) |
| 003: | FROM master table |
| 004: | WHERE gender = 'M' AND age = ? |
| 005: | ITERATE FOR age (25, 26, 27, 28, 29) |

As can be seen from Table IV, lines 001-004 correspond to lines 001-004 of the SQL query of Table I, except that the value "25" in the query condition "age=25" (line 004 of Table I) was replaced with a placeholder "?" in line 004 of Table IV ("age=?"). In line 005 of Table IV, an "ITERATE FOR" clause indicates that the values 25-29 should be used for the "age" field in the query condition included with line 004 ("age (25, 26, 27, 28, 29)").

In one embodiment, the suitable definition of the authorized modifications is included with a separate data structure. In the given example, the exemplary alternatives table shown in Table V below that is associated with the SQL query of Table I may define the authorized modifications.

TABLE V

EXEMPLARY ALTERNATIVES TABLE

| | | |
|---|---|---|
| 001: | result field | alternative value |
| 002: | age | 26 |
| 003: | age | 27 |
| 004: | age | 28 |
| 005: | age | 29 |

As can be seen from Table V, the alternative values 26-29 are defined for the "age" field of the SQL query of Table I (lines 002-005).

However, it should be noted that other implementations are also possible. For instance, the user may indicate an authorized modification or input an alternative query only in response to the notification at step 452 as described below with reference to step 482. All such implementations are broadly contemplated.

If it is determined at step 460, that at least one alternative query and/or the suitable definition of the authorized modifications is available, processing proceeds with step 462. Otherwise, processing proceeds with step 470.

At step 462, the SQL query of Table I is modified or an alternative query is retrieved. The modified or alternative query replaces the SQL query of Table I. Processing then returns to step 420, where the automated execution process is re-started using the modified or alternative query.

In one embodiment, the modified or alternative query is only used when it is determined at step 450 that the predefined condition is not satisfied. However, in another embodiment the automated execution process can be performed for each available modified and/or alternative query Furthermore, instead of re-starting the automated execution process for the modified or alternative query, it can simply be resumed. For instance, assume that the first fifty samples were processed using the SQL query of Table I and that the modified query requesting information with respect to 26 year old individuals is used for the $51^{st}$ sample. Assume further that the predefined condition is satisfied for the modified query for the first fifty samples (i.e., samples 1-50), as it was for the SQL query of Table I, but not for the $51^{st}$. Thus, by executing the modified query directly against the $51^{st}$ sample, processing is accelerated as it can immediately be determined that the query result obtained for the modified query is not included with the allowable range defined in line 003 of the exemplary range table of Table III. If, however, the predefined condition is satisfied for the modified query for the last fifty samples (i.e., samples 51-100), the automated execution process can be repeated for the modified query with respect to the first fifty samples. Thus, it can be determined whether also the query results obtained for the modified query for execution against the first fifty samples are included with an underlying allowed range of values as defined by the exemplary range table of Table III. All such implementations are broadly contemplated.

At step 470, it is determined whether at least one alternative condition or a definition of authorized modifications to the predefined condition exists. In one embodiment, an alternative condition or a definition of authorized modifications to the predefined condition can be created by the user upon creation of the SQL query of Table I or at least prior to iterative execution of the underlying query. For instance, in the given example an alternative range table may define broader value ranges. Alternatively, a suitable definition can be available that indicates that modifying the allowable range for the first to $10^{th}$ sample ([0.90; 1.10] in line 002 of Table III) to the range [0.85; 1.15] is authorized, if required. However, it should be noted that other implementations are also possible. For instance, in the given example the user may indicate an authorized modification to the range table of Table III or input an alternative range table in response to the notification received at step 452, as described below with reference to step 482. All such implementations are broadly contemplated.

If it is determined at step 470, that at least one alternative condition or a definition of authorized modifications to the predefined condition is available, processing proceeds with step 472. Otherwise, processing proceeds with step 480.

At step 472, an alternative condition is retrieved or the predefined condition is modified. In the given example, the exemplary range table of Table III is modified or an alternative range table is retrieved. The modified or alternative range table replaces the exemplary range table of Table III. Processing then returns to step 420, where the automated execution process is re-started or resumed using the modified or alternative range table, similar to re-starting or resuming as described above with reference to step 462.

At step 480, it is determined whether any other action should be performed. If so, the other action is performed at step 482 and processing then proceeds with step 420. Otherwise, processing returns to step 340 of FIG. 3. For instance, the other action may consist in determining an amount of time required to process all remaining samples and to provide a corresponding indication to the user. This determination can also be made after each successful completion of the loop consisting of steps 430-482. Furthermore, the other action may consist in prompting the user for input indicating whether query processing should be terminated or not. Moreover, the requesting entity can be requested to modify the query or to provide an alternative query. Similarly, the requesting entity can be requested to modify the predefined condition or to provide an alternative predefined condition. To this end, information can be displayed to the user indicating why the automated execution process was interrupted to allow the user to accurately adjust the SQL query of Table I or the exemplary range table of Table III. For instance, all data records of the processed sample having values that are not included with an associated allowable range of values can be shown to the user so that he may determine how to adjust the exemplary range table of Table III. If, however, the user requests to terminate the query processing, processing returns to step 340 of FIG. 3.

However, in one embodiment the user can decide to resume query processing without providing a modified or alternative query and/or range table in order to get an overall query result with respect to all samples. Thus, the user can determine a number of samples that do not provide values included with an underlying allowable range of values. In other words, assume that in the given example the obtained value of the avg(optimal_heart_rate/current_heart_rate) result field is 1.10 for the $50^{th}$ sample and, thus, not included with the allowable range defined in line 003 of Table III. Assume further that the user requests at step 482 to resume the automated execution process. Thus, processing returns to step 420 where the automated execution process is resumed starting with the $51^{st}$ sample. Accordingly, the loop consisting of steps 430 to 482 is entered at step 430 for the $51^{st}$ sample and repeated until the $100^{th}$ sample. Assume now that the overall query result indicates that the obtained value of the avg(optimal_heart_rate/current_heart_rate) result field is included with the allowable range defined in the range table of Table III for all samples except the $50^{th}$. This gives information to the user that can be the basis for further investigation.

Referring now back to FIG. 3, at step 340 output data (e.g., data output 206 of FIG. 4) is generated on the basis of query results obtained in the automated execution process performed at step 330. In one embodiment, the output data may simply indicate that the automated execution process completed successfully for the SQL query of Table I. If, however, the automated execution process was interrupted or terminated prior to completion, the output data may include an indication explaining why and at which sample or sampling interval the interruption or termination occurred. For instance, instead of generating an SQL code 100 indicating that a query result could not be determined, a new return code such as "−12xxx" can be created, where "−12" indicates that query processing was interrupted and/or terminated during the automated execution process. The "xxx" may indicate the sampling interval where the interruption and/or termination occurred. In one embodiment, the output data includes requested data and, thus, represents an overall query result. In other words, data for the result fields included with the SQL query of Table I (lines 002-003 of Table I) is included with the output data. All such implementations are broadly contemplated.

At step 350, the generated output data is returned to the requesting entity. Processing then exits at step 360.

It should be noted that any reference herein to particular values, definitions, programming languages and examples is merely for purposes of illustration. Accordingly, the invention is not limited by any particular illustrations and examples. Furthermore, while the foregoing is directed to embodiments of the present invention, other and further embodiments of the invention may be devised without departing from the basic scope thereof, and the scope thereof is determined by the claims that follow.

What is claimed is:

1. A computer-implemented method for managing execution of a query against a database having a multiplicity of data records, comprising:
    receiving, from a requesting entity, a query against the database; and
    performing an automated execution process, comprising:
        (i) iteratively executing the query against different samples of the database, each sample including a different subset of the multiplicity of data records;
        (ii) after each iterative execution of the query, determining whether a query result obtained for the iterative execution satisfies a predefined condition; and
        (iii) if the predefined condition is not satisfied, performing a predefined action.

2. The method of claim 1, further comprising, prior to each iterative execution of the query:
    selecting a plurality of data records from the multiplicity of data records, the plurality of data records defining a particular sample including a particular subset of the multiplicity of data records.

3. The method of claim 2, wherein selecting the plurality of data records from the multiplicity of data records comprises:
    for a given iterative execution, selecting only data records for the plurality of data records which are not included with a sample for any previous iterative execution of the query, whereby only non-overlapping samples of the database are selected for the iterative executions.

4. The method of claim 1, wherein the predefined condition defines an allowable range of values for values obtained in each iterative execution of the query, and wherein the predefined condition is only satisfied if the obtained values are included with the allowable range.

5. The method of claim 1, wherein performing the predefined action comprises:
    interrupting the iterative execution of the query against the samples of the database; and
    notifying the requesting entity that the predefined condition is not satisfied.

6. The method of claim 5, further comprising:
    in response to notifying the requesting entity, receiving a modified query from the requesting entity;
    iteratively executing the modified query against one or more samples of the database;
    after each iterative execution of the modified query, determining whether a query result obtained for the iterative execution satisfies the predefined condition; and
    if the predefined condition is not satisfied, performing the predefined action.

7. The method of claim 5, further comprising:
    in response to notifying the requesting entity, receiving a modified predefined condition from the requesting entity;

resuming the iterative execution of the query against one or more samples of the database;
determining whether the query result obtained for each subsequent iterative execution of the query satisfies the modified condition; and
if the modified condition is not satisfied, performing the predefined action.

8. The method of claim 1, further comprising, prior to iteratively executing the query against the samples of the database:
receiving alternative definitions from the requesting entity, the alternative definitions indicating at least one of:
(i) authorized modifications to the query; and
(ii) authorized modifications to the predefined condition.

9. The method of claim 8, wherein performing the predefined action comprises:
interrupting the iterative execution of the query against the samples of the database;
generating a modified query on the basis of the authorized modifications to the query;
iteratively executing the modified query against one or more samples of the database;
after each iterative execution of the modified query, determining whether a query result obtained for the iterative execution satisfies the predefined condition; and
if the predefined condition is not satisfied, performing the predefined action.

10. The method of claim 8, wherein performing the predefined action comprises:
interrupting the iterative execution of the query against the samples of the database;
generating a modified condition on the basis of the authorized modifications to the predefined condition;
resuming the iterative execution of the query against one or more samples of the database;
determining whether the query result obtained for each subsequent iterative execution of the query satisfies the modified condition; and
if the modified condition is not satisfied, performing the predefined action.

11. The method of claim 10, further comprising:
determining whether all previous query results obtained for the iterative executions performed prior to receiving the modified condition satisfy the modified condition; and
if the modified condition is not satisfied by one or more of the previous query results, performing the predefined action.

12. A computer readable medium containing a program which, when executed, performs operations for managing execution of a query against a database having a multiplicity of data records, the operations comprising:
receiving, from a requesting entity, a query against the database; and
performing an automated execution process, comprising:
(i) iteratively executing the query against different samples of the database, each sample including a different subset of the multiplicity of data records;
(ii) after each iterative execution of the query, determining whether a query result obtained for the iterative execution satisfies a predefined condition; and
(iii) if the predefined condition is not satisfied, performing a predefined action.

13. The computer readable medium of claim 12, wherein performing the automated execution process further comprises, prior to each iterative execution of the query:
selecting a plurality of data records from the multiplicity of data records, the plurality of data records defining a particular sample including a particular subset of the multiplicity of data records.

14. The computer readable medium of claim 13, wherein selecting the plurality of data records from the multiplicity of data records comprises:
for a given iterative execution, selecting only data records for the plurality of data records which are not included with a sample for any previous iterative execution of the query, whereby only non-overlapping samples of the database are selected for the iterative executions.

15. The computer readable medium of claim 12, wherein the predefined condition defines an allowable range of values for values obtained in each iterative execution of the query, and wherein the predefined condition is only satisfied if the obtained values are included with the allowable range.

16. The computer readable medium of claim 12, wherein performing the predefined action comprises:
interrupting the iterative execution of the query against the samples of the database; and
notifying the requesting entity that the predefined condition is not satisfied.

17. The computer readable medium of claim 16, wherein performing the automated execution process further comprises:
in response to notifying the requesting entity, receiving a modified query from the requesting entity;
iteratively executing the modified query against one or more samples of the database;
after each iterative execution of the modified query, determining whether a query result obtained for the iterative execution satisfies the predefined condition; and
if the predefined condition is not satisfied, performing the predefined action.

18. The computer readable medium of claim 16, wherein performing the automated execution process further comprises:
in response to notifying the requesting entity, receiving a modified predefined condition from the requesting entity;
resuming the iterative execution of the query against one or more samples of the database;
determining whether the query result obtained for each subsequent iterative execution of the query satisfies the modified condition; and
if the modified condition is not satisfied, performing the predefined action.

19. The computer readable medium of claim 18, wherein performing the automated execution process further comprises:
determining whether all previous query results obtained for the iterative executions performed prior to receiving the modified condition satisfy the modified condition; and
if the modified condition is not satisfied by one or more of the previous query results, performing the predefined action.

20. The computer readable medium of claim 12, wherein performing the automated execution process further comprises, prior to iteratively executing the query against the samples of the database:
receiving alternative definitions from the requesting entity, the alternative definitions indicating at least one of:
(i) authorized modifications to the query; and
(ii) authorized modifications to the predefined condition.

21. The computer readable medium of claim 20, wherein performing the predefined action comprises:
- interrupting the iterative execution of the query against the samples of the database;
- generating a modified query on the basis of the authorized modifications to the query;
- iteratively executing the modified query against one or more samples of the database;
- after each iterative execution of the modified query, determining whether a query result obtained for the iterative execution satisfies the predefined condition; and
- if the predefined condition is not satisfied, performing the predefined action.

22. The computer readable medium of claim 20, wherein performing the predefined action comprises:
- interrupting the iterative execution of the query against the samples of the database;
- generating a modified condition on the basis of the authorized modifications to the predefined condition;
- resuming the iterative execution of the query against one or more samples of the database;
- determining whether the query result obtained for each subsequent iterative execution of the query satisfies the modified condition; and
- if the modified condition is not satisfied, performing the predefined action.

23. The computer readable medium of claim 22, wherein performing the automated execution process further comprises:
- determining whether all previous query results obtained for the iterative executions performed prior to receiving the modified condition satisfy the modified condition; and
- if the modified condition is not satisfied by one or more of the previous query results, performing the predefined action.

24. A computer-implemented method for managing execution of a query against a database having a multiplicity of data records, comprising:
- receiving, from a requesting entity, a query against the database; and
- performing an automated execution process, comprising:
  - (i) iteratively executing the query against different samples of the database, each sample including a different subset of the multiplicity of data records;
  - (ii) after each iterative execution of the query, determining whether a query result obtained for the iterative execution satisfies a predefined condition; and
  - (iii) if the predefined condition is not satisfied, performing a predefined action;
- wherein the predefined action comprises:
  - interrupting the iterative execution of the query against the samples of the database;
  - notifying the requesting entity that the predefined condition is not satisfied;
  - in response to notifying the requesting entity, receiving a modified predefined condition from the requesting entity;
  - resuming the iterative execution of the query against one or more samples of the database;
  - determining whether the query result obtained for each subsequent iterative execution of the query satisfies the modified condition;
  - if the modified condition is not satisfied, performing the predefined action;
  - determining whether all previous query results obtained for the iterative executions performed prior to receiving the modified condition satisfy the modified condition; and
  - if the modified condition is not satisfied by one or more of the previous query results, performing the predefined action.

* * * * *